Dec. 2, 1969 R. B. O'NEAL 3,482,209

COMBINATION EMERGENCY AND SIGNALLING SYSTEM

Filed July 7, 1966 2 Sheets-Sheet 1

INVENTOR
ROBERT B. O'NEAL

BY Cushman, Darby & Cushman
ATTORNEYS

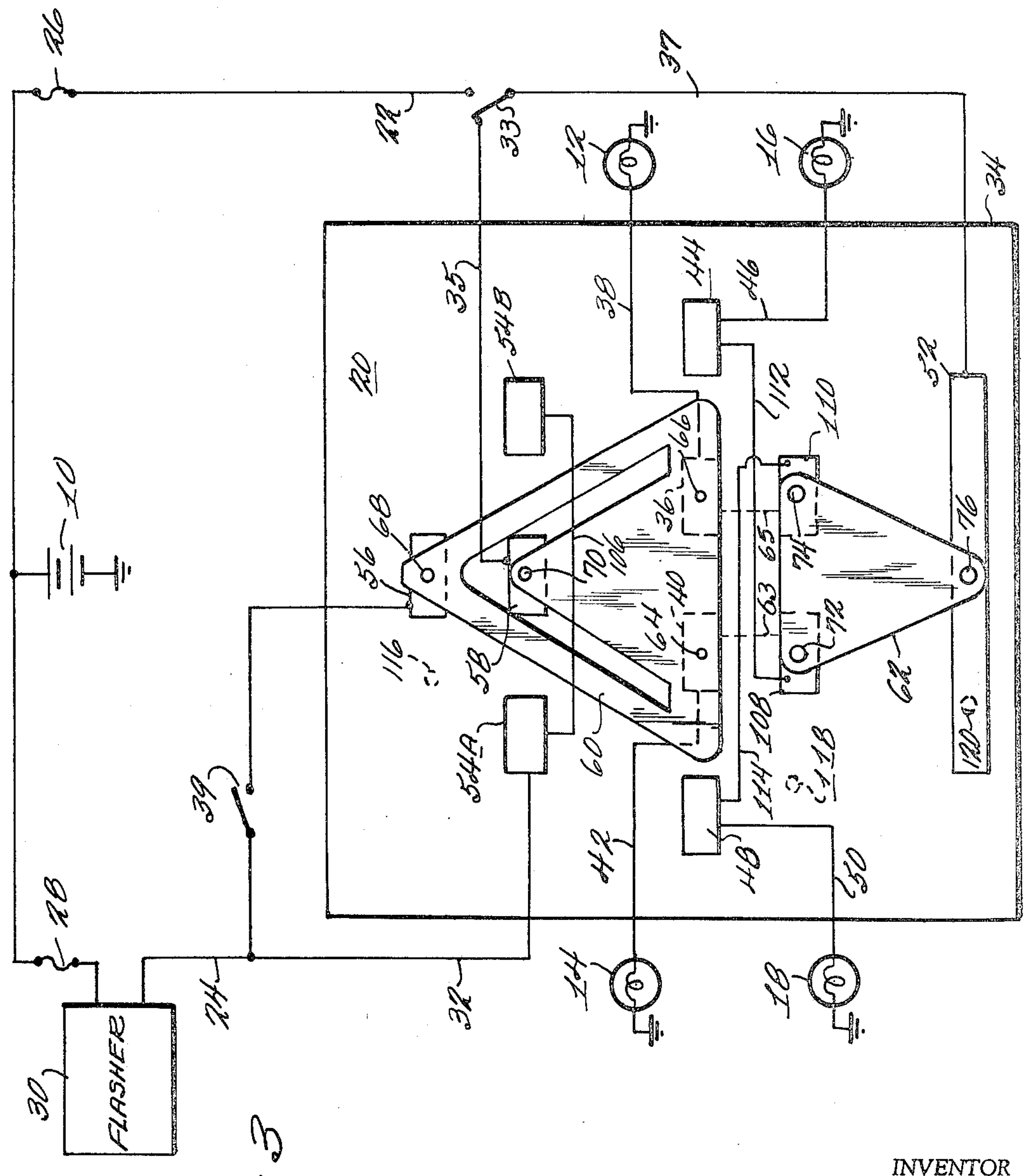
INVENTOR
ROBERT B. O'NEAL
BY Cushman, Darby & Cushman
ATTORNEYS 3,482,209
Patented Dec. 2, 1969

3,482,209
COMBINATION EMERGENCY AND SIGNALLING SYSTEM

Robert B. O'Neal, 607 Johnson Drive, Cleveland, Miss. 38732

Filed July 7, 1966, Ser. No. 563,545
Int. Cl. B60q *1/00, 1/34;* H01h *3/16*
U.S. Cl. 340—67 14 Claims

ABSTRACT OF THE DISCLOSURE

Improved signalling, brake and emergency switching circuitry for use in vehicles wherein the emergency feature is overridden whenever braking occurs and wherein the left or right turn signals will also override the emergency system. In addition, the system provides for the overriding of the brake signal by the turn signal so as to be sure that pedestrians or drivers in the vicinity of the vehicle will be made aware of any turns anticipated by the vehicle.

This invention relates to improved signalling, brake and emergency switching circuitry; and, in particular, to such circuitry as employed with an automobile.

The improved switch employed in this invention is readily manufactured by relatively simple modifications to existing signalling and brake switches which are presently employed in automobiles. Thus, it is a first object of this invention to provide an improved signalling, brake and emergency switch which may be economically manufactured.

Further, it is an object of this invention to provide an improved signalling, brake and emergency switch in an automobile wherein the emergency feature is overridden whenever signalling or braking occurs. That is, the illustrative embodiment of this invention described in the following specification employs means for flashing all four lights (two front and two rear) of an automobile when an emergency switch is closed. However, when it is necessary to make a turn or brake the automobile while the emergency condition is being signalled to other drivers, the left or right turn signals or the brake signal will override the emergency system until the turn and/or braking is completed.

Figure 2:
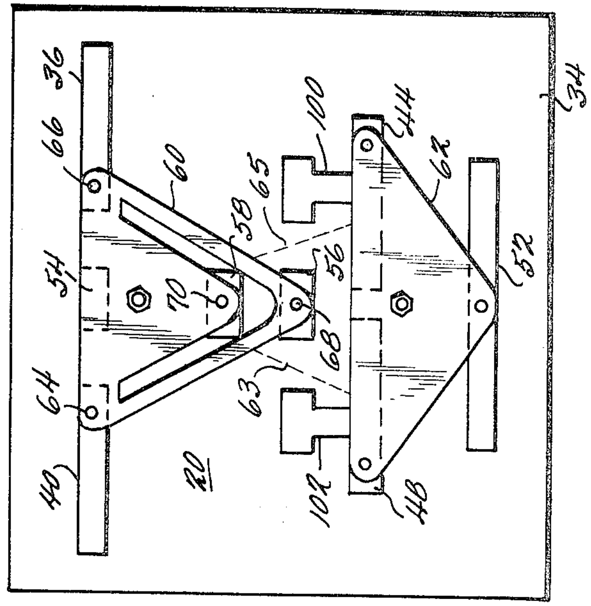
Figure 1:
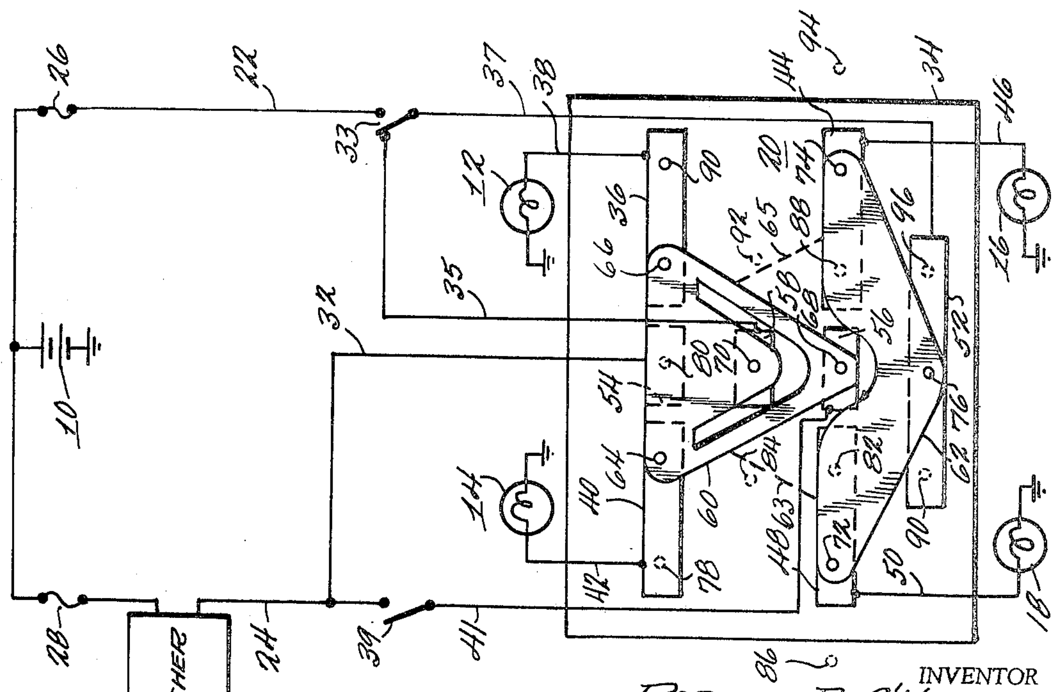

Other objects and advantages of this invention will become apparent upon reading the appended claims in conjunction with the following detailed description and the attached drawings, in which:

FIGURES 1, 2 and 3, respectively, diagrammatically illustrate three different embodiments of the invention.

Referring to FIGURE 1, there is illustrated a first illustrative embodiment of the invention. A battery 10 provides energizing power for the various signalling lamps employed. These signalling lamps will preferably be employed in an automobile; however, the principle of this invention may be employed in other vehicles or areas where it is applicable, as will occur to those having ordinary skill in this art. The signalling lamps are as follows: right front lamp 12, left front lamp 14, right rear lamp 16, and left rear lamp 18. The battery 10 is connected to a switch element 20, via a brake line 22 and a signalling line 24. A fuse 26 is included in the brake line and a fuse 28 and a flasher 30 are included in the signalling line 24. The flasher 30 is preferably of the high capacity type, for example, "Tung-Sol–536," which is the brandname of a commercially available flasher. A signal line 32 is connected to the switch 20 from line 24.

A 3-way switch 33 is connected to the switch 20 via lines 35, 22 and 37. The switch 33 is controlled by the application of the automobile brakes and is shown in its unactuated position. The switch 33 may be made from an overdrive kick-down switch where two of the four terminals are joined. Of course, a conventional three-way switch may also be employed.

An emergency switch 39 is connected to switch 20 via line 41. Emergency switch 39 may be of the push-down type and is closed or actuated, upon the occurrence of an emergency condition, by the driver of the automobile. The switch 39 is shown in its unenergized position in FIGURE 1.

The switch 20 includes the following terminals mounted on to a base plate 34 which preferably is made of a non-conducting material and mounted appropriately within the automobile according to well-known techniques. The base plate 34 has mounted thereon the following terminals: right front signal lamp terminal 36 connected to right front lamp 12 via line 38, left front signal lamp terminal 40 connected to left front lamp 14 via line 42, right rear signal and brake lamp terminal 44 connected to right rear lamp 16 via line 46, left rear signal and brake lamp terminal 48 connected to left rear lamp 18 via line 50, brake and emergency input terminal 52 connected to the brake and emergency input line 37, signalling input terminal 54 connected to signalling input line 32, emergency input terminal 56 connected to line 41, and emergency output terminal 58 connected to secondary emergency output line 35.

Switch 20 also includes turn signalling contact plate 60 and brake contact plate 62, both of which are made of electrically conductive material. Both of contact plates 60 and 62 are mechanically connected together (as diagrammatically shown at 63 and 65 in FIGURE 1) and move as a single unit to the right or left when actuated by the signal lever on the steering column of the automobile. The contact plates 60 and 62 are shown in the neutral or center position in FIGURE 1. The contact plate 60 includes four indentations or contact points 64, 66, 68, and 70 which, respectively contact terminals 40, 36, 56, and 58 while the contact plate 60 is in the center position shown in FIGURE 1. The move of contact plate 60 to the left or right will cause some of the contact points 64 through 68 to engage other terminals on the base plate 34 as will be described in more detail hereinafter. The brake contact plate 62 includes three indentations or contact points 72, 74, and 76 which, respectively, contact the terminals 48, 44, and 52 when plate 62 is in the position shown in FIGURE 1. The movement of plate 62 to the right of left will change the configuration of active circuitry as will be shown hereinafter.

Having now described the structure of the first illustrative embodiment of the invention, the operation thereof will now be described.

Assuming the switching system is off, that is, no lamps energized, the switches 20, 33, and 39 will be in the positions shown in FIGURE 1. No flow of current to the lamps is possible through lines 37 and 41 because of the positions of switches 39 and 33 respectively. Further, no current flow occurs in line 32 because neither of the contact points 64 or 66 is in contact with terminal 54.

Next assume that only the brakes are applied. This results in switch 33 being moved from the position shown in FIGURE 1 to its actuated position, while switches 20 and 39 remain in the positions shown in FIGURE 1. This connects the battery 10 through lines 22 and 37 to contact plate 52. The circuit is completed to right rear lamp 16 through contact point 76, plate 62, contact point 74, terminal 44, line 46, and lamp 16. The circuit to left rear lamp 18 is completed from contact point 76, plate 62, contact point 72, terminal 48, line 50, and lamp 18. Thus, the right and left rear lamps burn continuously and steadily until the brake is released, thereby returning switch 33 to its unactuated position and turning off the brake lamps.

Next assume that only the emergency switch 39 has been actuated with the switches 20 and 33 being in the position shown in FIGURE 1. This results in the closure of switch 39 and the connection of battery 10 through flasher 30 and lines 24 and 41 to terminal 56 of switch 20. The circuit is completed to left front signal lamp 14 through contact point 68, plate 60, contact point 64, terminal 40, line 42, and lamp 14. The circuit to lamp 12 is completed from contact point 68, plate 60, contact point 66, terminal 36, line 38, and lamp 12. The circuit to left rear signal and brake lamp 18 is completed through contact point 68, plate 60, contact point 70, terminal 58, line 35, switch 33, line 37, terminal 52, contact point 76, plate 62, contact point 72, terminal 48, line 50, and lamp 18. The circuit to complete energization for right rear signal and brake lamp 18 is the same as that for lamp 16, except that from contact point 76 the circuit is as follows: plate 62, contact point 74, terminal 44, line 46, and lamp 16. Thus it can now be seen that the flasher 30 is connected in a series-parallel circuit with lamps 12 through 18 and each of these burn in pulsating flashes, thereby providing an emergency signal to all drivers or pedestrians in the vicinity of the automobile.

Next it is assumed that the brakes are applied while the emergency signal is on. That is, it is assumed that while switch 20 is in the position shown in FIGURE 1 and switch 39 has been closed, that switch 33 is moved to its actuated position by the application of the brakes. Thus, before the application of the brakes, lamps 12 through 18 are pulsating as described above. With the application of the brakes, switch 33 is moved to its actuated position, thereby disconnecting line 35 from line 37 and removing the pulsating current provided by flasher 30 to the rear signal and brake lamps 16 and 18. In place of the pulsating current applied to lamps 16 and 18, a direct current is now applied over line 22 through switch 33 and line 37 to terminal 52. This results in the continuous and steady energization of the lamps 16 and 18 in the manner described hereinbefore with respect to the situation where the brakes only are applied. This steady energization of the lamps 16 and 18 continues as long as the brakes are applied. As soon as they are released, the switch 33 returns to its normal, unactuated position, thereby reconnecting the pulsating current from flasher 30 through switch 33 and to the rear lamps 16 and 18 in the manner described above with respect to the emergency signal only being on. Thus, it can now be seen that the invention provides means for applying an emergency signal to all four lamps of the automobile, together with the means for overriding the emergency signalling whenever it is necessary to apply the brakes while the emergency signal is on. It can be appreciated that this feature is, indeed, quite essential to traffic safety in that means must be provided for notifying drivers and pedestrians in the vicinity of an automobile having its emergency lights actuated, that the automobile is braking.

Next assume that the left turn signal is actuated by proper movement of the signal lever on the steering column. This results in the movement of the contact plates 60 and 62 to the left by mechanical means which are well known to those skilled in this art. The contact points 64 through 76 are respectively moved to dotted positions 78, 80, 82, 84, 86, 88, and 90. The switches 33 and 39 are in their unactuated positions as shown in FIGURE 1. The battery 10 is connected to terminal 54 through flasher 30, and lines 24 and 32. The circuit to left front signal lamp 14 is completed from terminal 54 through contact point 66, contact plate 60, contact point 64, terminal 40, line 42, and lamp 14. The circuit to left rear signal and brake lamp 18 is connected from terminal 54 through contact point 66, plate 60, contact point 68, terminal 48, line 50, and lamp 18. Thus, the left turn signals are actuated in both the front and rear, there being no energization applied to the right front and rear lamps 12 and 16 respectively, since the contact point 66 is removed from the terminal 36 and since the contact point 70 is removed from terminal 58.

Next assume that the brake signal is applied while the left turn signal is on. This results in switch 33 being shifted to its actuated position thereby connecting battery 10 to terminal 52 through lines 22 and 37. The direct current circuit from battery 10 is completed through right rear lamp 16 from terminal 52 through contact point 76, contact plate 62, contact point 74, terminal 44, line 46, and lamp 16. The pulsating energization of the left front and rear lamps 14 and 18 remains undisturbed since both of these are controlled by contact plate 60 while the direct current energization of lamp 16 takes place through contact plate 62 which has been disconnected from terminal 48. Hence, in this mode of operation the switch 20 operates in a mode well known to those skilled in this art. The steady energization of lamp 16 will continue as long as the brake is applied. When it is released, switch 33 returns to its normal position, thereby leaving the lamps 14 and 18 in their pulsating condition until the left turn is completed. At this time, the lever on the steering column returns the contact plates to the center position automatically in a manner well known to those skilled in this art.

Next assume that the left turn signal and the emergency switch are actuated at the same time. That is, switch 20 is in its left-most position as described above with respect to the situation where a left turn only occurs. Also, switch 33 will be in the position shown in the drawings and switch 39 will be closed. Pulsating current will be applied to the front and rear left lamps 14 and 18 as above described with respect to the left turn only situation. Pulsating current will not be applied to the right front and rear lamps 12 and 16 as long as the left turn signal is on because contact point 68 is disengaged from terminal 56. However, as soon as the plates 60 and 62 return to their center position as shown in FIGURE 1 after the turn is completed, pulsating current will be applied to lamps 12 through 18 in the manner described hereinbefore with respect to the situation where only the emergency switch is operated. Thus, it can be seen that the operation of the left turn signal while the emergency signal is on will remove pulsating current from lamps 12 and 16. Thus, the turn signal operation overrides the emergency signal operation, thereby providing a further safety feature which insures that drivers and pedestrians in the vicinity of the automobile will be made aware of any turns anticipated by the automobile while it is indicating an emergency condition. Since the emergency switch 39 is connected to terminal 56, there can be no energization of lamps 12 and 16 until the plate 60 returns to the center position from the left position.

Next assume that the left signal, brake signal and emergency signal are all actuated at the same time. That is, switches 33 and 39 are in their actuated positions and switch 20 is in its left-most position. The left front and rear lamps 14 and 18 will be energized by pulsating current in the manner described hereinbefore where the left lamps only are energized. The right rear lamp 16 will be energized by direct current in the manner described hereinbefore where the situation left turn signal and brake signal are simultaneously energized. The right front lamp 12 will not be energized since the contact plate 60 is in its left-most position, as described hereinbefore with respect to energization of the left turn signal only. Although the emergency switch 39 is also energized at this time, it has no effect on the energization of the lamps 12 through 18, since terminal 56 is not connected to contact point 68 at this time. The return of contact plates 60 and 62 to the center position after the completion of the turn, but before the release of the brakes, will result in pulsating current being applied to the front lamps 12 and 14 and direct current being applied to rear lamps 16 and 18 in the manner described hereinbefore for the situation where the brake is applied while the emergency signal is on.

Alternatively, the release of the brake before the completion of the turn will result in the removal of direct current from lamp 16 but the lamps 14 and 18 will continue to flash in the manner described hereinbefore for the situation where the left turn signal is on at the same time as the emergency signal. The completion of the left turn together with the release of the brake returns the switch 20 to its center position and the switch 33 to its unactuated position, thereby resulting in pulsating current being applied to lamps 12 through 18 in the manner described hereinbefore for the emergency signal only.

Hence, it can now be seen that either the turn signal or the brake signal, or both, can override the emegency signal. As pointed out hereinbefore, this feature is of utmost importance since drivers in the vicinity of a car in an emergency condition must be notified whenever the driver of this car intends to turn or brake.

The switch 20 is a modification of a signalling switch which is presently employed on many automobiles today. The modifications are as follows: the addition of (1) the emergency input and output terminals 56 and 58 to the base 34 and (2) the contact point 70 to the contact plate 60 and the extension of the front right and left signal lamp terminals 36 and 40 toward the center so as to insure contact of both terminals by contact plate 60 when it is in its center position. By making these straightforward modifications to the switch 20, the numerous advantages described above are gained. Further modifications made to the circuitry normally associated with the signalling switch are as follows: the emergency switch 39 and the 3-way brake switch 33. These elements also contribute to the advantages described above by providing a combination emergency and signalling system which utilizes as much of the present signalling systems which are employed in automobiles today as possible. Thus, the incorporation of the combined signalling and emergency switch of this invention into the signalling systems presently employed is accomplished with a minimum of time and effort. This is significantly important in insuring that the advantages of an emergency signalling system are made available to as many automobile owners as possible, regardless of cost of their particular automobiles.

The operation of the switch shown in FIGURE 1 has been described for the left turn signal only in various combinations with the emergency and braking signals. The operation of the right turn signal is exactly the same as that for the lefthand signal with the obvious difference that the right turn signals will function opposite to the left, but in the same manner. Thus, the contact points 64 through 76 will move to the respective dotted positions shown in FIGURE 1: points 80, 90, 88, 92, 82, 94, and 96.

Reference should now be made to FIGURE 2 which is a second illustrative embodiment of the invention which constitutes a slight modification of the embodiment shown in FIGURE 1. This modification involves the movement of the terminal 56 upwardly from a position centered between the terminals 44 and 48 to the position shown in FIGURE 2. To accommodate this movement of the terminal 56, the terminals 44 and 48 are reshaped as shown in FIGURE 2. Thus, the contact point 68 of signalling contact plate 60 is in electrical contact with the extensions 100 and 102 of terminals 44 and 48, respectively, for right and left turns thereby rendering the operation of the modified switch shown in FIGURE 2 exactly the same as that described for FIGURE 1. The remaining elements of the switch 20 shown in FIGURE 2 are exactly the same as those shown in FIGURE 1. Further, the associated circuitry of switch 20, as shown in FIGURE 2, is the same as that shown in FIGURE 1. Hence, the operation of the switches shown in FIGURES 1 and 2, respectively, is identically the same.

Reference should now be made to FIGURE 3 which shows a further embodiment of the invention with a rearrangement of the various terminals on base plate 34.

That is, the emergency input and output terminals 56 and 58 are moved to an upper portion of base 34. The signal terminal 54 of FIGURE 1 is divided so that two terminals 54A and 54B connected by line 106 are provided. The right and left front signal lamp terminals 36 and 40 of FIGURE 1 are rearranged as shown in FIGURE 3. The left and right rear terminals 44 and 48 are also relocated so that they are placed in the same line as terminals 36 and 40, as shown in FIGURE 3. The left and right rear terminals 44 and 48 are also connected to terminals 108 and 110 by lines 112 and 114 respectively. Brake and emergency input terminal 52 remains the same as in FIGURE 1. Contact points 64 through 76 shown in FIGURE 3 have the same structure as the contact points with corresponding reference numerals in FIGURE 1. However, the function of the contact points 64 through 76 of FIGURE 3 changes in the sense that when they are moved to the left or right positions, they cause a different routing of the energizing current for the lamps 12 through 18.

The associated circuitry comprising battery 10, flasher 30, switches 33 and 39 is connected to the terminals of the modified switch 20 of FIGURE 3 in the same manner as that shown in FIGURE 1.

Having now described the structure of the embodiment of FIGURE 3, the operation thereof will now be described. When the switches 33 and 39 are in their unactuated positions and switch 20 is in its center position, no current flows through any of the lines. In particular, no current flows from line 32, since the terminals 54A and 54B are not contacted by contact point 70.

With the brakes only on, the current is supplied from battery 10 through line 22, switch 33 and line 37 to contact plate 52. The circuit is completed to the brake lamp 16 from terminal 52 through contact point 76, plate 62, contact point 72, line 112, terminal 44, line 46, lamp 16. The direct current energization of lamp 18 is completed from terminal 52, contact point 76, plate 62, contact point 74, line 114, terminal 48, line 50, lamp 18.

When the emergency signal only is on, switch 39 is actuated while switches 20 and 33 remain unactuated. Thus, pulsating current is provided to lamps 12 through 18 from battery 10, through flasher 30, and switch 39 to emergency input terminal 56. The current path to right front lamp 12 is completed from terminal 56 through contact point 68, plate 60, contact point 66, terminal 36, line 38, and lamp 12. The current path to lamp 14 is completed from terminal 56 through contact point 68, plate 60, contact point 64, terminal 40, line 42, and lamp 14. The current path through right rear signal and brake lamp 16 is completed from terminal 56 through contact point 68, plate 60, contact point 70, terminal 58, line 35, switch 33, line 37, terminal 52, contact point 76, plate 62, contact point 72, terminal 108, line 112, terminal 44, line 46, and lamp 16. The energization for left rear lamp 18 is the same as that for right rear lamp 16, except that from plate 62 the circuit is completed through contact point 74, terminal 110, line 114, terminal 48, line 50, and lamp 18.

When the brakes are applied while the emergency signal is on, switch 33 switches to its actuated position, this being the only difference with respect to the circuit configuration just described with respect to the emergency signal only being on. The movement of switch 33 disconnects line 35 from line 37, thereby removing the pulsating current from rear lamps 16 and 18. These lamps are now energized directly from the battery 10 in a manner similar to that described hereinabove with respect to the brake signal only being on. Thus, it can be seen that the application of the brakes will override the emergency signal until the brakes are removed.

When the left turn signal only is on, the plates 60 and 62 are moved to their left-most position, the contact points 64 through 76 moving to the following respective positions: terminal 48, terminal 40, dotted position 116, terminal 54A, dotted position 118, terminal 108, and dotted position 120. Thus, pulsating current is applied through flasher 30 from battery 10 to line 32 and terminal 54A. The circuit to left front lamp 14 is completed from terminal 54A through contact point 70, plate 60, contact point 66, line 42, and lamp 14. Pulsating current is applied to left rear lamp 18 from terminal 54A through contact point 70, plate 60, contact point 64, terminal 48, line 50, and lamp 18.

When the brake is applied while the left turn signal is on, switch 33 is moved to its actuated position and connects battery 10 to terminal 52. The energization of right rear lamp 16 is completed from terminal 52 through contact point 76, plate 62, contact point 72, terminal 108, line 112, terminal 44, line 46, and lamp 16. No direct current energization is provided to lamp 18 at this time, since terminal 110 is not contacted by contact point 74.

When the left turn signal and emergency switch are both on, switches 20 and 39 are actuated while switch 33 is not. The energization of the left front and rear lamps 14 and 18 occurs in the manner described above with respect to only the left turn signal being on. The emergency signal applied through switch 39 is not effective at this time, since contact point 68 is disconnected from terminal 56. The completion of the turn will return the plates 60 and 62 to the center position, thereby reconnecting contact point 68 to terminal 56. Thus, the lamps 12 through 18 will all to energized with pulsating current in the manner described hereinbefore with respect to only the emergency signal being on.

When the left turn, brake and emergency signals are all on, the brake and turn signals will take precedence over the emergency signal while they are being operated. Thus, the left turn signal and brake signal will operate in combination as described hereinbefore with respect to the description of the brake and left turn signals being on. The release of the brake before the completion of the turn will move switch 33 back to its unactuated position. However, pulsating current will not be applied to lamp 12 because contact point 66 is disconnected from terminal 36 and pulsating current will not be applied to right rear lamp 16 because contact point 70 is disconnected from terminal 58. If the left turn is completed before the brakes are released, the right and left front turn lamps 12 and 14 will be provided with pulsating current when the plate 60 returns to its center position since the contact points 64 and 66 are in electrical connection with terminals 40 and 36, respectively. However, the rear lamps 16 and 18 continue to steadily burn while the switch 33 remains in its actuated position. The return of switch 33 to its unactuated position upon release of the brakes causes pulsating current to be applied to all four lamps, 12 through 18, in the manner described hereinabove for the situation where the emergency signal only is on.

Thus, there has now been described first switching means (switch 20) operative in response to the operation of the signal lever on the steering column of a vehicle such as an automobile or a truck, the first switching means having three positions corresponding to the three well-known positions of the signal lever. The first switching means includes a first terminal 56, a second terminal 58, a third terminal 36, a fourth terminal 40, a fifth terminal 54, a sixth terminal 44, a seventh terminal 48, and an eighth terminal 52. The circuitry associated with first switching means 20 includes second switching means (switch 39) operable by the driver of the vehicle normally in response to an emergency situation for connecting an electrical energy source such as an automobile battery and a flasher to at least two of the lamps on the vehicle, for instance, the front lamps 12 and 14 thereof. Thus, when the second switching means is operated, an emergency signal is provided, as described hereinbefore, to other vehicles and pedestrains in the vicinity of the first mentioned vehicle. Also, a third switching means (switch 33) is provided and operative in response to the application of the brakes of the vehicle. This third switching means is preferably a 3-way switch which connects the battery and flasher to further lamps (lamps 16 and 18) preferably mounted on the rear of the vehicle when the signal lever is in its neutral position, the emergency switch 39 is actuated, and the brake switch 33 is not actuated by the application of the brakes. Switch 20 also includes the base plate 34 upon which the terminals thereof are preferably, but not necessarily, mounted. Through these terminals the battery and/or the battery and flasher are connected to the various lamps mounted on the vehicle in various combinations in accordance with the position of the three switching means discussed above. The switch 20 further preferably includes a member movable with respect to the base plate, the movable member including a first part (plate 60), and a second part (plate 62), these two parts being electrically insulated from one another but mechanically movable as a single unit.

Further, it can now be seen that the improved switch of this invention may be derived from signalling switches presently used in automobiles today for controlling turn and brake signals. The basic modification is as follows: the switch 20 must connect the lamps of an automobile to a battery and flasher through terminals such as terminals 56 and 58 and a switch such as switch 39. It does not matter whether these terminals are positioned on the base 34 of the switch 20, or whether they are positioned at some point removed from the base plate 34. As long as these terminals are provided with energizing current from the flasher 30, when the switch 20 is in its neutral position and emergency switch 39 is closed, the advantages of this invention are obtained. The 3-way brake switch 33 further provides economical means for connecting all four lamps to the flasher when the emergency switch is on and for disconnecting the flasher from the rear lamps when the brakes are applied.

Although all of the switches employed in this invention are described as mechanically actuated, it would of course be obvious to one having ordinary skill in this art to provide for the magnetic operation of these switches.

Still numerous other modifications of the invention will become apparent to one of ordinary skill in the art upon reading the foregoing disclosure. During such a reading, it will be evident that this invention has provided a unique switching arrangement for accomplishing the objects and advantages herein stated. Still other objects and advantages, and even further modifications will be apparent from this disclosure.

What is claimed is:

1. Improved signalling, brake, and emergency switching circuitry for use with a vehicle which includes a signal lever, a source of electrical energy and a flasher, said circuitry comprising:

first switching means operative in response to the said signal lever, said first switching means having three positions corresponding to the three positions of the signal lever, which are left turn, neutral or no turn, and right turn, and said first switching means including a first terminal;

second switching means operable by the driver of the vehicle normally in response to an emergency situation for connecting said electrical energy source and said flasher through said first terminal to at least two of the lamps on said vehicle whenever said signal lever is in its neutral position and thereby providing an emergency signal to other vehicles and pedestrians in the vicinity of the first mentioned vehicle;

said first switching means including a second terminal and wherein said circuitry includes a third switching means operative in response to the application of the brakes of said vehicle;

said second terminal connecting said electrical energy source and said flasher through said third switching means to at least two further lamps of said vehicle in addition to said first-mentioned two lamps when said signal lever is in its neutral position, said second switching means is actuated, and said brakes are not applied.

2. Circuitry as in claim 1 where said two further lamps are disposed at the rear of said vehicle.

3. Circuitry as in claim 1 where said first switching means includes a base plate upon which is mounted said first and second terminals, and said first switching means including a member movable with respect to said terminals in response to the operation of said signal lever said movable member including means for contacting said terminals when said signal lever is in its neutral position.

4. Circuitry as in claim 3 where said movable member disengages said terminals in response to said signal lever being moved from its neutral position.

5. Circuitry as in claim 1 where said third switching means includes a three-way switch which connects said second terminal to said two further lamps when said brake is not actuated and which connects said battery directly to said rear lamps thereby producing a direct current path through the lamps when said brakes are applied.

6. Circuitry as in claim 3 where said first switching means includes third and fourth terminals mounted on said base plate which are respectively connected to said first-mentioned lamps, said movable member including at least two further contact means, said two further contact means connecting said battery and flasher to said first-mentioned lamps from said first terminal through said movable member and said third and fourth terminals when said signal lever is in its neutral position.

7. Circuitry as in claim 6 including a fifth terminal connected to said flasher and mounted on said base plate said flasher being connected to one of said first-mentioned two lamps from said fifth terminal through said movable member and said third and fourth terminal when said signal lever is moved from its neutral position.

8. Circuitry as in claim 7 where said third, fourth, and fifth terminals are aligned along a first direction on said base plate.

9. Circuitry as in claim 7 where said second terminal and said fifth terminal are aligned along a first direction on said base plate.

10. Circuitry as in claim 6 where said first switching means includes sixth and seventh terminals mounted on said base plate which are respectively connected to said further two lamps, said movable member including first and second parts electrically insulated from one another, said first, second, third, fourth and fifth terminals being associated with said first part and said sixth and seventh terminals associated with said first and second part, said second part including contact means for connecting said battery and flasher to said further two lamps from said first terminal through said first part of said movable member, said second terminal, said third switching means, said second part of said movable member, and said sixth and seventh terminals whenever said second switching means is actuated, said signal lever is in its neutral position, and said brakes are not applied.

11. Circuitry as in claim 7 including sixth and seventh terminals mounted on said base plate and respectively connected to said further two lamps and where said third, fourth, sixth, and seventh terminals are aligned along a predetermined direction on said base plate.

12. Circuitry as in claim 8 further including:

an eighth terminal mounted on said base plate and connected to said sixth terminal;

a ninth terminal mounted on said base plate and connected to said seventh terminal;

said second part of said movable member being in electrical contact with said eighth and ninth terminals when said signal lever is in its neutral position.

13. Circuitry as in claim 12 further including:

a tenth terminal mounted on said base plate and connected to said third switching means;

said second part of said movable member being in electrical contact with said tenth terminal when said signal lever is in any of said three positions, which are left turn, neutral or no turn and right turn.

14. Circuitry as in claim 11 further including:

an eighth terminal mounted on said base plate and connected to said sixth terminal;

a ninth terminal mounted on said base plate and connected to said seventh terminal;

said second part of said movable member being in electrical contact with said eighth and ninth terminals when said signal lever is in its neutral position.

References Cited

UNITED STATES PATENTS 3,185,961 5/1965 Du Rocher ---------- 340—81

JOHN W. CALDWELL, Primary Examiner

H. COHEN, Assistant Examiner

U.S. Cl. X.R.

200—61.27; 340—73